US010359028B2

(12) United States Patent
Ma et al.

(10) Patent No.: US 10,359,028 B2
(45) Date of Patent: Jul. 23, 2019

(54) AIR-COOLED WIND POWER GENERATOR SYSTEM AND FLUID COOLING DEVICE

(71) Applicant: XINJIANG GOLDWIND SCIENCE & TECHNOLOGY CO., LTD., Urumqi, Xinjiang (CN)

(72) Inventors: Shengjun Ma, Beijing (CN); Wanshun Ma, Beijing (CN)

(73) Assignee: XINJIANG GOLDWIND SCIENCE & TECHNOLOGY CO., LTD., Urumqi, Xinjiang (CN)

( * ) Notice: Subject to any disclaimer, the term of this patent is extended or adjusted under 35 U.S.C. 154(b) by 0 days.

(21) Appl. No.: 15/564,599

(22) PCT Filed: Feb. 20, 2017

(86) PCT No.: PCT/CN2017/074120
§ 371 (c)(1),
(2) Date: Oct. 5, 2017

(87) PCT Pub. No.: WO2017/148288
PCT Pub. Date: Sep. 8, 2017

(65) Prior Publication Data
US 2018/0080435 A1    Mar. 22, 2018

(30) Foreign Application Priority Data

Mar. 2, 2016 (CN) .......................... 2016 1 0118831

(51) Int. Cl.
*H02K 9/04* (2006.01)
*F03D 9/25* (2016.01)
(Continued)

(52) U.S. Cl.
CPC ................ *F03D 9/25* (2016.05); *F03D 9/28* (2016.05); *H02K 5/24* (2013.01); *H02K 7/1838* (2013.01);
(Continued)

(58) Field of Classification Search
CPC .......... F03D 9/25; F03D 9/28; F05B 2260/96; F05B 2260/20; F05B 2260/201;
(Continued)

(56) References Cited

U.S. PATENT DOCUMENTS 6,676,122 B1 *   1/2004   Wobben ................. F03D 80/60
                                                       290/55
8,941,257 B2 *   1/2015   Iwata ........................ H02P 9/02
                                                       290/55
(Continued)

FOREIGN PATENT DOCUMENTS

CN            1649239 A        8/2005
CN          101793236 A        8/2010
(Continued)

OTHER PUBLICATIONS

First Office Action issued by the Australian Patent Office dated Sep. 20, 2018; Appln. No. 2017227662.
(Continued)

*Primary Examiner* — Tulsidas C Patel
*Assistant Examiner* — S. Mikailoff
(74) *Attorney, Agent, or Firm* — Ladas & Parry LLP

(57) ABSTRACT

A wind power generator system includes: a generator including a generator cavity; a separation device configured to perform multi-phase flow separation on an upwind direction flow and including an air inlet configured to introduce the upwind direction flow and an air outlet in communication with the generator cavity; and an exhaust fan in communication with the generator cavity and configured to exhaust hot air flow in the generator cavity. A fluid transfer device includes: a power equipment including an overheated cavity; a separation device configured to perform multi-phase flow separation on an upwind direction flow and including an air inlet and an air outlet; and an exhaust fan. With the wind
(Continued)

power generator system and the fluid transfer device, the overheated cavity can be cooled by using air in the natural environment and the overheated cavity is prevented from being damaged.

22 Claims, 8 Drawing Sheets

(51) Int. Cl.
  *H02K 9/26* (2006.01)
  *F03D 9/28* (2016.01)
  *H02K 5/24* (2006.01)
  *H02K 7/18* (2006.01)
(52) U.S. Cl.
  CPC ............... *H02K 9/04* (2013.01); *H02K 9/26* (2013.01); *F05B 2260/96* (2013.01); *Y02E 10/725* (2013.01)
(58) Field of Classification Search
  CPC .......... H02K 5/24; H02K 7/1838; H02K 9/00; H02K 9/02; H02K 9/04; H02K 9/005; H02K 9/06; H02K 9/08; H02K 9/14; H02K 9/26; Y02E 10/725; Y02E 10/726
  See application file for complete search history.

(56) References Cited

U.S. PATENT DOCUMENTS

| | | | |
|---|---|---|---|
| 9,624,908 B2 | 4/2017 | Airoldi et al. | |
| 10,014,735 B2* | 7/2018 | Ma | H02K 7/1838 |
| 10,038,352 B2 | 7/2018 | Airoldi et al. | |
| 2005/0160740 A1 | 7/2005 | Nakano et al. | |
| 2010/0176600 A1* | 7/2010 | Pabst | H02K 1/278 |
| | | | 290/55 |
| 2011/0001371 A1* | 1/2011 | Landeta Manzano | B01D 45/08 |
| | | | 310/58 |
| 2012/0032449 A1 | 2/2012 | Wobben | |
| 2012/0074709 A1* | 3/2012 | Cole | H02K 1/32 |
| | | | 290/55 |
| 2013/0270825 A1* | 10/2013 | Iwata | H02P 9/02 |
| | | | 290/44 |
| 2014/0346781 A1* | 11/2014 | Airoldi | H02K 7/1838 |
| | | | 290/1 B |
| 2015/0381013 A1 | 12/2015 | Davies et al. | |
| 2018/0038351 A1* | 2/2018 | Jacobsen | F03D 9/25 |
| 2018/0080435 A1* | 3/2018 | Ma | H02K 9/26 |

FOREIGN PATENT DOCUMENTS

| | | |
|---|---|---|
| CN | 201837282 U | 5/2011 |
| CN | 102377266 A | 3/2012 |
| CN | 103490558 A | 1/2014 |
| CN | 203962149 U | 11/2014 |
| CN | 105074133 A | 11/2015 |
| CN | 105210273 A | 12/2015 |
| CN | 105553182 A | 5/2016 |
| CN | 105736258 A | 7/2016 |
| CN | 205595950 U | 9/2016 |
| EP | 2958215 A1 | 12/2015 |
| JP | 2848838 B2 | 1/1999 |
| JP | 2014-033584 A | 2/2014 |

OTHER PUBLICATIONS

The Extended European Search Report dated Oct. 17, 2018; Appln. No. 17759139.3.
The Second Chinese Office Action dated Feb. 24, 2018; Appln. No. 201610118831.8.
International Search Report; PCT/CN2017/074120.

* cited by examiner

AIR-COOLED WIND POWER GENERATOR SYSTEM AND FLUID COOLING DEVICE

This application is the national phase of International Application No. PCT/CN2017/074120, titled "WIND POWER GENERATOR SYSTEM AND FLUID TRANSPORTATION DEVICE", filed on Feb. 20, 2017 which claims the benefit priority to Chinese patent application No. 201610118831.8 titled "WIND POWER GENERATOR SYSTEM AND FLUID TRANSFER DEVICE", filed with the Chinese State Intellectual Property Office on Mar. 2, 2016, the entire disclosures of which applications are incorporated herein by reference.

FIELD

The present application relates to the technical field of air cooling, and in particular to a wind power generator system and a fluid cooling device.

BACKGROUND

A wind power generator is a device for converting wind power into electric energy, which mainly includes a generator, blades and other components. In the conventional technology, a wind power generator with a permanent magnet synchronous motor is generally used. The wind power generator is generally used outdoors, the natural environment is harsh, and a permanent magnet of the generator cannot stand high temperature, therefore cooling of the generator becomes especially important. In order to cool the generator and reduce cost, air cooling is generally adopted in the conventional technology, that is, air in the natural environment is introduced into an air gap between a stator and a rotor of the generator to perform heat exchange, thus achieving cooling.

However, air in the natural environment generally contains a lot of water vapor, sand dust and other impurities, which is actually a multi-phase flow formed by the mixing of air, liquid and solid. For example, the multi-phase flow is formed by multiple types of substances, such as air, water vapor, rain snow, salt mist, dust and floccules. The water and salt contained in the multi-phase flow may damage a magnetic pole of the generator and even result in irreversible demagnetization, and may also damage the insulation mechanism of the generator. Solid phase substances such as dust contained in the multi-phase flow may cause the generator to be worn after entering the generator, thereby normal use of the generator and reducing a service life of the generator is adversely affected.

Therefore, a technical problem urgently to be solved by those skilled in the art presently is to design a wind power generator system, in which the generator is protected while air cooling is performed to maintain and improve the insulation performance of the generator and reduce wearing of the generator.

In addition, a technical problem also urgently to be solved by those skilled in the art presently is to design a fluid cooling device, such that air cooling is performed on an overheated cavity of a power equipment and the power equipment is prevented from being damaged by the impurities contained in an upwind direction flow.

SUMMARY

An object of the present application is to provide a wind power generator system, such that a multi-phase flow entering a generator can be pre-separated, to reduce water and impurity entering the generator, thereby maintaining and improving an insulation performance of the generator while achieving cooling, and reducing wearing to a heat exchange surface of the cavity inside the generator.

Another object of the present application is to provide a fluid cooling device, to perform air cooling on a power equipment to be cooled such as an inner combustion engine, a traction motor and a textile motor, and to prevent the power equipment from being damaged by impurities in an upwind direction flow.

In order to solve the first technical problem, a wind power generator system is provided according to the present application, which includes: a generator including a generator cavity; a separation device configured to perform multi-phase flow separation on an upwind direction flow and including an air inlet configured to introduce the upwind direction flow and an air outlet in communication with the generator cavity; and an exhaust fan in communication with the generator cavity and configured to exhaust hot air flow in the generator cavity.

The wind power generator system according to the present application is provided with the separation device. Multi-phase flow separation is performed to the upwind direction flow by the separation device, to remove solid particles and/or liquid drops in the upwind direction flow, thereby forming dry and clean air to be transferred to the generator cavity as cooling medium. The cooling medium performs heat exchange in the generator cavity to cool the generator, and is then exhausted by the exhaust fan. In one aspect, air in the natural environment is used as the cooling medium in the present application, thus the cost can be saved and pollution of the cooling medium to the environment can be reduced. In the other aspect, the cooling medium generated by separation process is dry and clean air, which does not damage the generator, and particularly dose not influence the insulation performance of the generator, and does not wear the generator due to mixing of solid particles, such that the generator has high use intensity. In addition, the cooling medium entering the generator cavity is exhausted by the exhaust fan after performing heat exchange, forming an open-type circulation of the cooling medium. Compared with a closed-type circulation structure, the cooling effect can be improved, and a space of the wind power generator system is saved since no device for cycling has to be provided. When the generator includes an outer rotor, a magnet yoke and a permanent magnetic pole exposed outside suffer high-temperature irradiation in summer; and demagnetization occurs in permanent magnet materials when temperature rise is too high. With the wind power generator system according to the present application, an armature and the permanent magnetic pole are cooled continuously and efficiently by air in the natural environment, so as to effectively protect the permanent magnetic pole and the outer rotor magnet yoke, thereby ensuring normal operation of the generator.

In order to solve another technical problem of the present application, a fluid cooling device is further provided according to the present application, which includes: a power equipment with an overheated cavity; a separation device configured to perform multi-phase flow separation on an upwind direction flow and including an air inlet configured to introduce the upwind direction flow and an air outlet in communication with the overheated cavity; and an exhaust fan in communication with the overheated cavity and configured to exhaust the hot air flow in the overheated cavity.

BRIEF DESCRIPTION OF THE DRAWINGS

In FIGS. 1-13:

| | |
|---|---|
| 1 generator | 2 blade |
| 3 separation device | 4 exhaust fan |
| 5 heater | 6 separator heating branch pipeline |
| 7 blade heating branch pipeline | 8 noise absorber |
| 9 exhaust device | 10 nacelle |
| 20 tower; | |
| 11 generator cavity | 111 inner cavity |
| 112 middle cavity | 113 outer cavity; |
| 21 pivotal bearing; | |
| 31 first separator | 311 outer cylinder |
| 312 inner container | 313 air flow passage |
| 314 spiral flow guide vane cascade | 315 separation segment |
| 316 flaring segment | 317 expansion cavity |
| 318 first soot blower | 319 deposition box; |
| 32 second separator | 321 outer cylinder |
| 322 inner cylinder | 323 collection box |
| 324 air lock | 325 second soot blower; |
| 33 branch pipeline | 34 flow guide surface |
| 341 outer convex arc surface | 342 inner concave arc surface; |
| 41 diffuser; | |
| 81 expansion joint noise reduction cavity | 82 resonance noise reduction cavity |

DETAILED DESCRIPTION OF EMBODIMENTS

A wind power generator system is provided according to an embodiment of the present application, such that multi-phase flow separation can be performed on the air entering a generator to reduce water and impurity entering the generator, thereby maintaining or improving an insulation performance of the generator while achieving cooling, and reducing wearing to a heat exchange surface of a cavity inside the generator.

A fluid cooling device is further provided according to an embodiment of the present application, which can perform air cooling on an overheated cavity of a power equipment and does not damage the power equipment.

The wind power generator system according to the present application is introduced specifically in conjunction with drawings hereinafter, such that those skilled in the art can understand technical solutions of the present application accurately.

Figure 1:
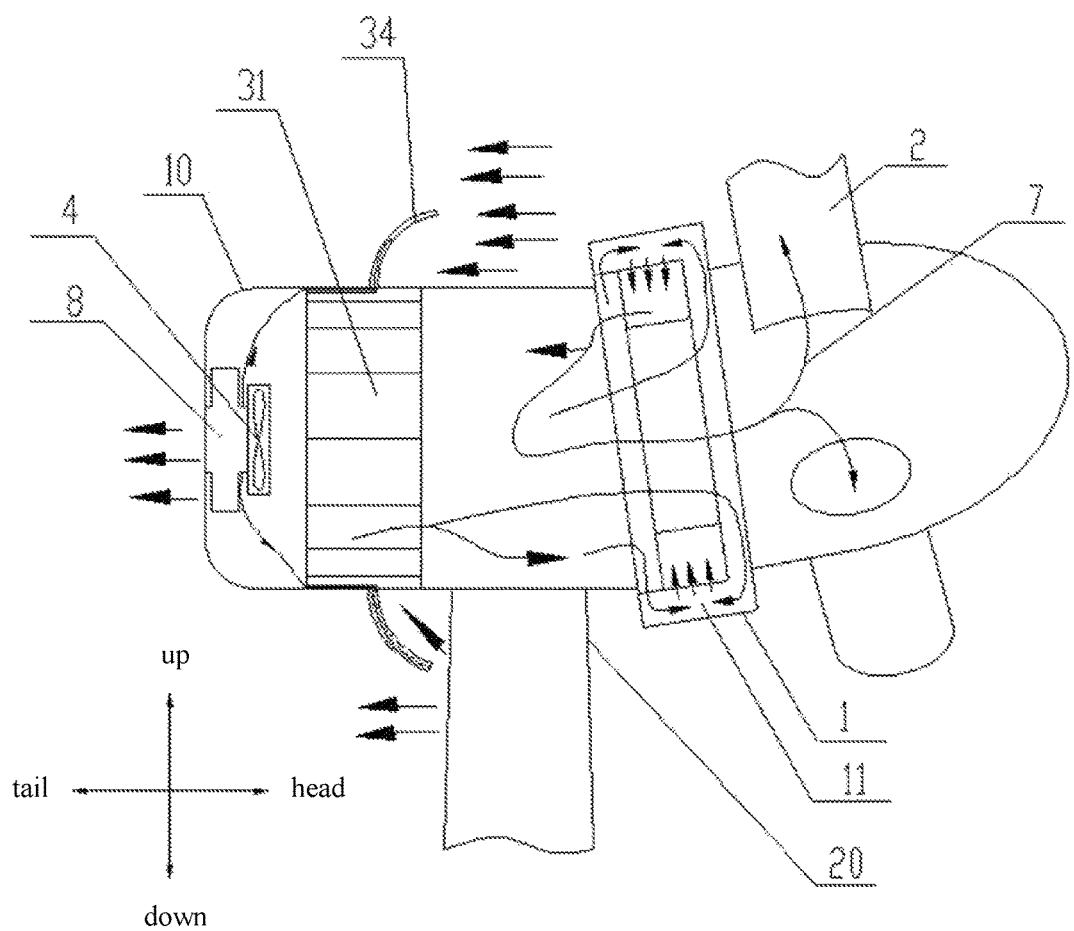
FIG. 1 is a side view of a wind power generator system according to a first embodiment of the present application.
Figure 2:
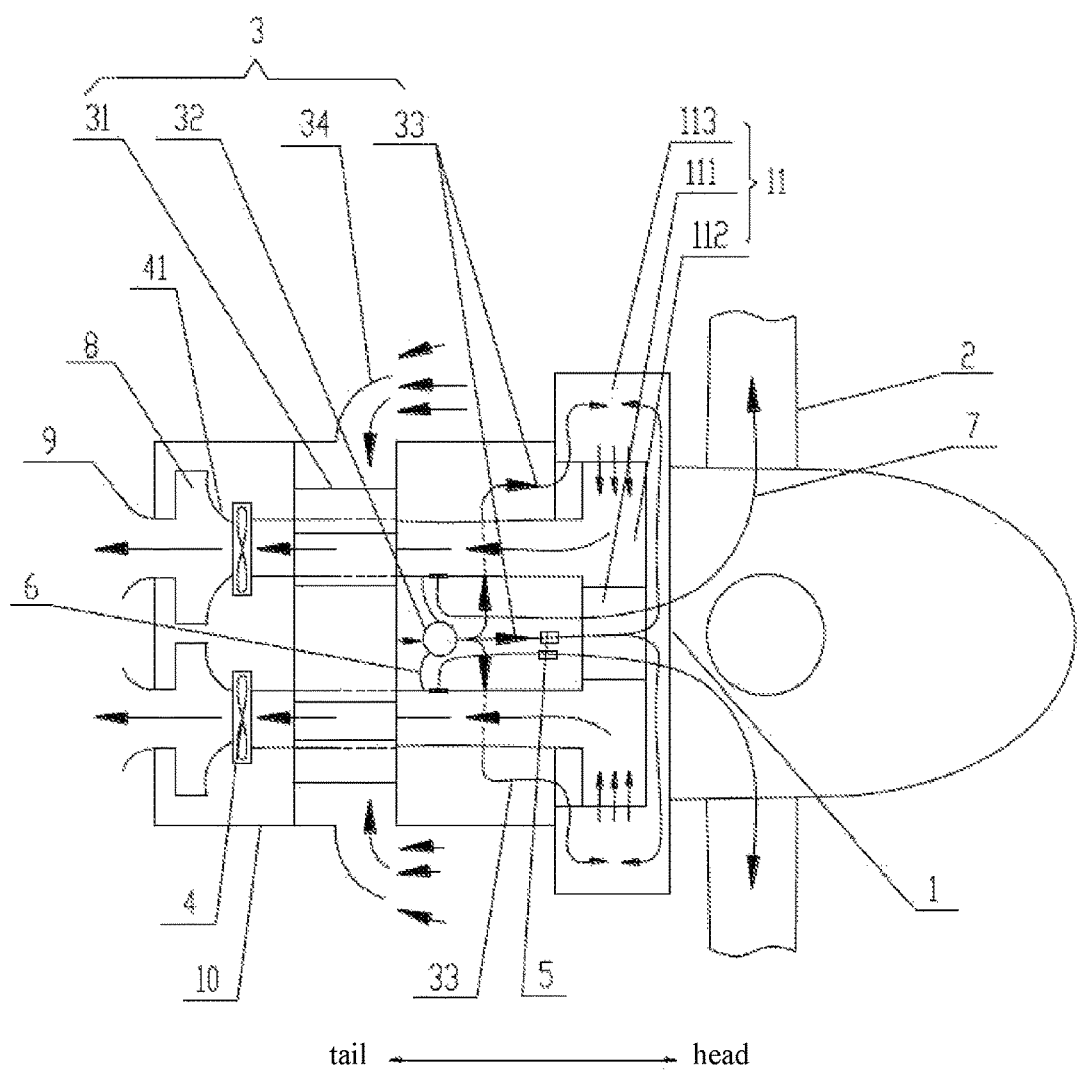
FIG. 2 is a top view of the wind power generator system according to the first embodiment of the present application.

FIG. 1 and FIG. 2 are respectively a side view and a top view of a wind power generator system. As shown in FIG. 1 and FIG. 2, the wind power generator system includes: a generator 1, blades 2, a nacelle 10 and a tower 20. The nacelle 10 is arranged on the top of the tower 20. When the blades 2 rotate under the action of wind power, a rotor of the generator 1 rotates together.

The terms "up" and "down" described in the embodiments of the present application take a wind power generator system as reference. Generally, an extending direction of the tower 20 of the wind power generator system is an up-down direction, a direction directed towards ground is down, and a direction opposite to down is up. An axial direction described in the embodiments of the present application refers to an extending direction of a generator shaft of the generator 1, and a circumferential direction and a radial direction are also defined according to the generator shaft of the generator 1.

Unless otherwise specified herein, inner and outer described in the embodiments of the present application are defined with reference to the generator shaft. In a radial direction, a direction close to the generator shaft is inner, and a direction away from the generator shaft is outer. In an axial direction, a direction close to a center of the generator shaft is inner, and a direction away from the center of the generator shaft is outer.

The head and tail of the nacelle 10 of the wind power generator system described in the embodiments of the present application are defined with reference to a wind direction, an end located at an upwind direction is the head, and an end located at a downwind direction is the tail.

As shown in FIG. 1 and FIG. 2, a wind power generator system is provided according to the present application, which includes a generator 1 and blades 2 indirectly connected to a rotor of the generator 1. In the wind power generator system, the generator 1 includes a generator cavity 11, and the generator cavity refers to air gap inside the generator 1. The generator 1 generates a lot of heat energy during the operation process, and may also absorb heat energy in the natural environment in a case that an external environmental temperature is high. These heat energies diffuse to the generator cavity 11. That is to say, with the operation of the generator 1, a lot of heat energy is stored in the generator cavity 11, and it is especially important to cool the generator 1 timely and effectively so as to control the temperature rise. Air cooling has many advantages. However, a cooling medium in the natural environment is generally not clean enough and is a multi-phase fluid, which may adversely affect an insulation performance of the generator 1 and wear the generator 1.

In view of the above technical problem, the wind power generator system according to the present application further includes a separation device 3. An air inlet of the separation device 3 is configured to introduce an upwind direction flow, and the separation device 3 is configured to separate solid particles and/or liquid drops in the upwind direction flow to form dry and clean air. The separation device 3 includes an air outlet configured to exhaust the clean air and is in communication with the generator cavity 11, such that the clean air functioning as cooling medium is transferred into the generator cavity 11. The cooling medium absorbs heat in the generator cavity 11 to cool the generator 11. The generator cavity 11 is further in communication with an exhaust fan 4. The cooling medium, after absorbing heat in the generator cavity 11, forms hot air flow with a high temperature, and the exhaust fan 4 in communication with the generator cavity 11 is configured to exhaust the hot air flow, such that the cooling medium processed by the separation device 3 continuously enters the generator cavity 11 to perform heat exchange, thereby achieving open-type circulation of the cooling medium. The so called open-type is defined relative to a closed-type, and the closed-type refers to that the medium gets in and out circularly. Accordingly, the open-type refers to that the medium enters the generator cavity and then is exhausted directly without recycling.

By arranging the separation device 3 according to the present application, the technical problem of demagnetization and wearing generated during performing natural air cooling to the generator 1 is solved, thereby effectively reducing energy consumption during the cooling process. Even more important, the generator cavity 11 is in communication with the exhaust fan 4; in one aspect, clean air generated after being separated can be effectively introduced into the generator cavity 11 for improving the cooling efficiency; and in the other aspect, the hot air flow can be controlled to flow out of the generator cavity 11 quickly, so as to improve heat exchange efficiency and cooling effect of the generator 1. Particularly, when the generator 1 adopts a permanent magnetic pole outer rotor and inner armature, the permanent magnetic pole and a magnetic yoke supporting the permanent magnetic pole are exposed outside. Temperature rise is too high when an external environmental temperature is too high, and it is easy to generate demagnetization. According to the present application, the cooling efficiency is improved, and the permanent magnetic pole and the magnetic yoke can be protected effectively, thereby extending a service life of the generator 1 and improving use reliability of the generator 1. In addition, compared with the closed-type circulation, the hot air flow is exhausted by the exhaust fan 4 in the present application, and the exhaust fan 4 may be a blower or an induced fan, thereby saving a space for processing and storing the circulating air flow, simplifying the structure of the wind power generator system and reducing a volume of body accessory heat exchange devices in the wind power generator system. Further, compared with the closed-type circulation, with the open-type circulation of the cooling medium, it can be ensured that the cooling medium entering the generator cavity 11 can maintain a low temperature, thus facilitating improvement of the heat exchange efficiency and cooling effect.

As shown in FIG. 2, the separation device 3 is located in the nacelle 10 and may include a first separator 31 and a second separator 32. When both the first separator 31 and the second separator 32 are provided, the first separator 31 and the second separator 32 each include an air outlet for exhausting air generated after separation. An air inlet of the first separator 31 is configured to introduce an upwind direction flow, the air outlet of the first separator 31 is in communication with an air inlet of the second separator 32, and the air outlet of the second separator 32 is in communication with the generator cavity 11. In other words, the upwind direction flow sequentially flows through the first separator 31 and the second separator 32 to be separated, and then enters the generator cavity 11 to perform heat exchange. In this case, the first separator 31 may perform rough separation, the second separator 32 may perform fine separation, and a separation fineness degree of the first separator 31 may be lower than that of the second separator 32.

It should be understood that, those skilled in the art may set the number and structure of the separators as required, and the number of the separators is not limited to two; in addition, the separators may be connected in series or in parallel. The terms "first" and "second" are only used for distinguishing multiple components with the same or similar structure, and are not intended to specially limit the order.

A heater 5 may be further provided in a communication pipeline of the air outlet of the second separator 32 and the generator cavity 11, so as to heat moisture-containing air entering the generator cavity 11, thereby forming a dry cooling medium with a low humidity.

Specifically, the air outlet of the second separator 32 may be provided with at least two branch pipelines 33, and each of the branch pipelines 33 may be in communication with the generator cavity 11, such that the air can enter the generator cavity 11 from all directions, so as to improve distribution uniformity of the cooling medium generated after separation in the generator cavity 11. At least one of the branch pipelines 33 may be provided with the heater 5, so as to reduce a relative humidity of the cooling medium entering the generator cavity 11.

Practically, the heater 5 may be provided in only one branch pipeline 33, and air flows from other branch pipelines 33 may directly enter the generator cavity 11 and converge in the generator cavity 11 to form a dry cooling medium with a low temperature, thereby avoiding overmuch increasing of the temperature of the cooling medium due to being heated by the heater 5, and preventing the heater 5 from influencing a cooling effect. Or, those skilled in the art may control a heating temperature of the heater 5 to form a cooling medium with a temperature far lower than a temperature in the generator cavity 11, and thus may also function to reduce a relative humidity.

In the wind power generator system shown in FIG. 2, the generator 1 includes an inner stator support, an inner stator iron core, a permanent magnetic pole and an outer rotor magnet yoke nested from inside to outside in the listed sequence. Slots for winding an inner stator winding are distributed at an interval in a circumferential direction of the inner stator iron core, the permanent magnetic pole and an air gap of the inner stator iron core are in communication with each other, and an annular air gap is formed between the permanent magnetic pole and the outer rotor magnet yoke. In this case, the generator cavity 11 may include an inner cavity 111, a middle cavity 112 and an outer cavity 113 sequentially arranged from inside to outside. A cavity of the inner stator support forms the inner cavity 111, and the inner cavity 111 is axially passed through. An air gap formed between the inner stator iron core and the permanent magnetic pole is the middle cavity 112. An annular air gap between the permanent magnetic pole and the outer rotor magnet yoke is the outer cavity 113. Since the inner cavity 111 is axially passed through, the cooling medium flows into the outer cavity 113 in a radial direction via an axial end of the generator 11 to be in communication with the outer cavity 113. The cooling medium may enter via the inner cavity 111 or the outer cavity 113, converges at the outer cavity 113, and then is exhausted via the middle cavity 112. In this case, the branch pipelines 33 may be in communication with the inner cavity 111 or the outer cavity 113, and the middle cavity 112 and the exhaust fan 4 are in communication with each other via the branch pipelines 33, so as to guide the air flow to cool the generator 1.

At least one branch pipeline 33 in communication with the inner cavity 111 may be provided, at least one branch pipeline 33 in communication with the outer cavity 113 may be provided, and the heater 5 is provided in the branch pipeline 33 in communication with the inner cavity 111 or the outer cavity 113 to heat and dry air entering the inner cavity 111 or the outer cavity 113. Since there is a branch pipeline 33 in communication with both the inner cavity 111 and the outer cavity 113, and air flow entering the inner cavity 111 needs to flow through the outer cavity 113 to enter the middle cavity 112, the air flows transferred by the branch pipelines 33 converge at the outer cavity 113 to form a dry cooling medium with a low temperature, and then the cooling medium is transferred into the middle cavity 112, thereby improving a quality of the cooling medium entering the middle cavity 112 and cooling the generator 1 better.

Specifically, three branch pipelines 33 may be provided, two of the three branch pipelines 33 are in communication with two sides of the outer cavity 113 at radial direction respectively, the heater 5 is provided in the rest one of the three branch pipelines 33, and the rest branch pipeline 33 is in communication with the inner cavity 111. In this case, cold air from the two branch pipelines 33 is directly conveyed to the outer cavity 113 along the two sides at the radial direction, air from the rest branch pipeline 33 is dried by the heater 5 and then flows into the inner cavity 111, and diffuses outwards in radial directions from an end of the inner cavity 111 to flow into two sides of the outer cavity 113. The air from the three branch pipelines 33 converges at the outer cavity 113 to form a cooling medium with a high quality (i.e., has a low temperature and is dry), and the cooling medium is transferred into the middle cavity 112 to cool the armature sufficiently.

On the basis of the above description, a separator heating branch pipeline 6 may be further provided according to the present application. The separator heating branch pipeline 6 is configured to transfer the hot air flow exhausted from the generator cavity 11 to the second separator 32, to heat air to be separated in the second separator 32. Due to influence of the external environment, the upwind direction flow may contain impurity and have a high relative humidity, and the air flow transferred to the second separator 32 may contain a lot of solid particles and liquid drops and so on even after being initially separated by the first separator 31. In order to avoid blocking and freeze of the second separator 32, the hot air flow generated after performing cooling may be introduced to the second separator 32, so that the second separator 32 maintains a certain temperature, thereby avoiding freeze or condensing of the air transferred into the second separator 32 to be separated due to a too low temperature and ensuring separation reliability of the second separator 32. In addition, the hot air flow exhausted from the generator cavity 11 is transferred into the second separator 32, such that heat energy can be recycled to save energy source.

As shown in FIG. 2, the hot air flow described above may be exhausted by the middle cavity 112. Two sides of the middle cavity 112 each may be in communication with the exhaust fan 4 via an output pipeline. Or, two sides of the middle cavity 112 each are connected to an output pipeline, and a tail end of each output pipeline is connected to the exhaust fan 4. In this case, the separator heating branch pipeline 6 may be in communication with the output pipeline at one side or the output pipelines at two sides.

A blade heating branch pipeline 7 may be further provided according to the present application. The generator cavity 11 and an inner cavity of the blade 2 are in communication with each other via the blade heating branch pipeline 7. The blade heating branch pipeline 7 is configured to transfer the hot air flow exhausted from the generator cavity 11 to the inner cavity of the blade 2 to heat the blade 2, thereby preventing a front edge of the blade 2 from being frozen. Similarly, the hot air flow may be exhausted from the middle cavity 112. In this case, the hot air flow may be introduced to the inner cavity of the blade 2 via the output pipeline at one side, or the hot air flow may be introduced to the inner cavities of the blades 2 corresponding to output pipelines via the output pipelines at two sides.

Structures such as an air door and a fan may be provided at a position where the output pipeline communications with the blade heating branch pipeline 7, such that flowing of the hot air flow is accelerated while communication is achieved. When the blade heating branch pipeline 7 is provided, the blade 2 may be heated by utilizing the hot air flow after heat exchange effectively to prevent freezing of the blade 2, and it is not necessary to separately provide a structure such as a heating plate for the blade 2, thereby simplifying the structure of the blade 2 and reducing cost. The generator 1 generates no heat before operation, and by this time, it is not necessary to cool the generator 1, or rather the air flow after heat exchange exhausted from the generator cavity 11 has a low temperature, and thus cannot meet the requirement for heating the blade 2. Therefore, a heater may be provided in the blade heating branch pipeline 7 to heat the air flow transferred to the inner cavity of the blade 2 via the blade heating branch pipeline 7 at an initial stage of the operation of the generator 1, thereby achieving a reliable heating for the blade 2. When the generator 1 operates for some time, the heater in the blade heating branch pipeline 7 may be turned off, and the heater may be turned on as needed.

Other parts of the wind power generator system according to the present application are illustrated in detail in conjunction with the drawings by taking the first embodiment as an example hereinafter.

Figure 3:
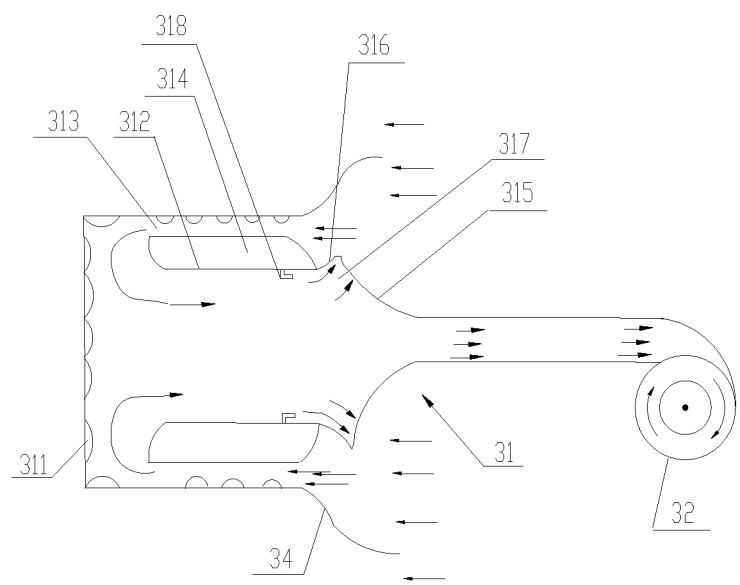
FIG. 3 is a top view of a separation device in the wind power generator system according to the first embodiment of the present application.
Figure 4:
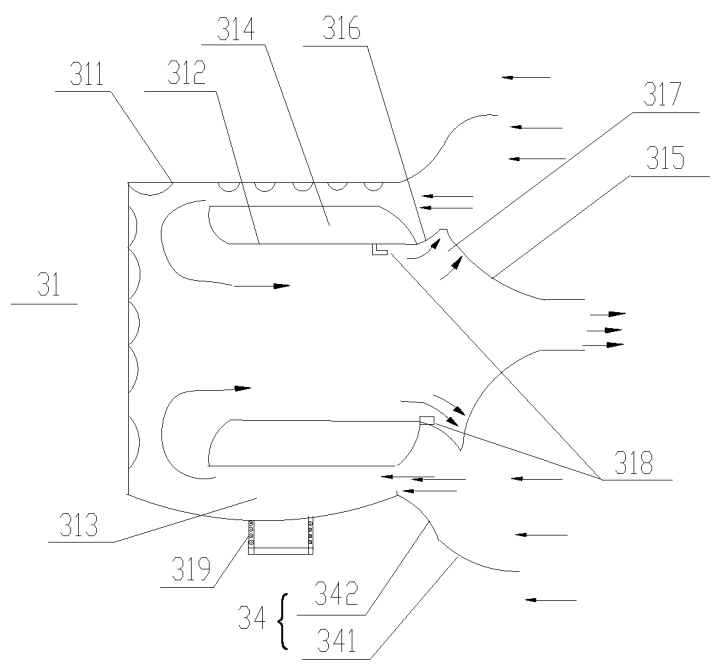
FIG. 4 is a partial side view of the separation device shown in FIG. 3.

The first separator 31 may have various types of structures, such as a cyclone separator. As shown in FIG. 3 and FIG. 4, the first separator 31 may include an outer cylinder 311 with one end closed, and an inner container 312 is nested in the outer cylinder 31. The inner container 312 is a hollow structure and includes a hollow cavity. The inner container 312 may have a hollow cylinder shape with two ends open, and the two ends of the inner container 312 form an air inlet and an air outlet respectively. An inner circumferential wall of the outer cylinder 311 and an outer circumferential wall of the inner container 312 may form an air flow passage 313 which extends roughly in an axial direction of the outer cylinder 311 and the inner container 312. The air inlet of the inner container 312 may face towards the closed end of the outer cylinder 311. One end of the air flow passage 313 may extend towards the closed end of the outer cylinder 311 and may be in communication with the air inlet of the inner container 312 so as to be in communication with the hollow cavity of the inner container 312. The other end of the air flow passage 313 forms an air inlet for introducing an upwind direction flow. The air outlet of the inner container 312 is in communication with the air inlet of the second separator 32. In this case, the upwind direction flow firstly flows through the air flow passage 313 between the outer cylinder 311 and the inner container 312, and then enters the inner container 312 and is transferred to the second separator 32 through the inner container 312. During the process of flowing through the air flow passage 313, the upwind direction flow impacts with a circumferential wall of the outer cylinder 311 and the inner container 312, so as to perform pre-separation. Since the air inlet of the inner container 312 is opposite to the air inlet of the upwind direction flow, the flow direction of the air flow in the air flow passage 313 turns 180 degrees in order that the air flow can enter the inner container 312, and a lot of impact is generated during the turning process, thereby performing further separation. During the process of the air flow flowing towards the air outlet of the inner container 312 along the hollow cavity of the inner container 312, the air flow may impact with an inner circumferential wall of the inner container 312 to achieve separation.

For structures of the first separator 31 and the second separator 32, "inner" and "outer" described in the embodiments of the present application are defined with reference to a central axis of each separator. A direction close to the central axis is inner, and a direction away from the central axis is outer.

The outer cylinder 311 and the inner container 312 may be coaxially arranged in parallel to the upwind direction flow. Two axial end openings of the inner container 312 may form the air inlet and the air outlet respectively, the air inlet of the inner container 312 faces towards the closed end of the outer cylinder 311, and the open end of the outer cylinder 311 and the air outlet of the inner container 312 are located at the same end. In this case, the upwind direction flow may firstly flow through the air flow passage 313 in the upwind direction, turns 180 degrees at a tail part of the air flow passage 313, and then flows along the inner container 312 opposite to the upwind direction.

The air outlet of the inner container 312 may be connected to a separation segment 315, and a caliber of the separation segment 315 may be set to progressively decrease in a direction from the first separator 31 to the second separator 32. In the embodiments shown in FIG. 3 and FIG. 4, the separation segment 315 may be substantially an arc-shaped revolved body concave inwards. Specifically, the arc-shaped revolved body may be formed by revolving an inward-concave arc by 360 degrees along a central axis of the first separator 31, so as to function as the separation segment 315. Generally, a pipeline for transferring the air is a straight pipe. However, in order to achieve separation, the inner container 312 must have enough volume, and a caliber of the air outlet of the inner container 312 is large; in this case, the separation segment 315 with a gradually decreasing caliber may be provided at the air outlet of the inner container 312, so as to connect the inner container 312 to a delivery pipe, thereby delivering the air flow to the second separator 32 via the delivery pipe.

Of course, the caliber of the separation segment 315 may gradually decrease only in the direction from the first separator 31 to the second separator 32, and the separation segment 315 is not necessarily to adopt a structure of the arc-shaped revolved body. However, in the case that the arc-shaped revolved body is adopted, an inner wall of the arc-shaped revolved body may guide the air flow, and a camber of the arc-shaped revolved body may be set so that the air flow flows along a tangent line direction of the separation segment 315, and further flows out of the inner container 312 smoothly. Compared with a hollow triangular cone structure, the separation segment 315 having the structure of the arc-shaped revolved body, may reduce the influence of the outputted air flow on the first separator 31, thus assisting in improving a separation effect of the first separator 31; and the air flow is enabled to quickly enter the second separator 32 to perform re-separation, so as to improve a transfer efficiency of the air flow.

In order to further prevent that the air flow carries a lot of water vapor with a low temperature, a thermal insulation interlayer or a heating interlayer may be provided on the separation segment 315 to prevent freeze of the separation segment 315, such that a transfer reliability of the air flow from the first separator 31 to the second separator 32 is ensured, thereby reducing the water vapor with the low temperature entering the second separator 32.

Meanwhile, the air outlet of the inner container 312 may be provided with a flaring segment 316 and is connected to the separation segment 315 by the flaring segment 316. The flaring segment 316 may extend outwards according to a certain radian from an end connected to the air outlet, or may extend outwards according to a linear relationship. A caliber of the flaring segment 316 progressively increases in a direction from the first separator 31 to the second separator 32, and the caliber of the separation segment 315 progressively decreases in a direction from the first separator 31 to the second separator 32. In this way, an accommodating cavity with a maximum radial size is formed at a connection position of the flaring segment 316 and the separation segment 315, and the accommodating cavity functions as an expansion cavity 317 for accommodating separated object.

The so-called separated object refers to substances separated from the air flow by the separator, including but not limiting to solid particles and liquid drops. The air flow flowing out of the inner container 312 still has a high impurity-containing rate, and the impurity continues to flow forward together with the air flow. The caliber of the connecting position of the flaring segment 316 and the separation segment 315 is large, in one aspect, a flow rate can be reduced and a capability of carrying the impurity is reduced; in the other aspect, time for the impurity to separate from the air flow and deposit is provided, such that a part of the impurity is retained in the expansion cavity 317, thereby achieving further separation. The impurity in the embodiment of the present application is relative to cooling, and any substances influencing cooling of the generator 1 or damaging the generator 1 are regarded as the impurity in the present application.

Since the air flow in the inner container 312 has a high moisture content, in this case, dust and so on in the separated object cakes under the action of moisture, resulting in that the flaring cavity 317 cannot store the separated object normally and even influence normal transfer of the air flow in the inner container 312. In view of such case, a first soot blower 318 such as an infrasonic wave soot blower may be provided in the upwind direction of the flaring cavity 317 in the present application, so as to blow the separated object. The arrangement of the first soot blower 318, in one aspect, allows the separated object to enter the flaring cavity 317 effectively, and in the other aspect, may prevent the dust from accumulating and caking, such that the first separator 31 and the second separator 32 operate continuously and effectively.

As shown in FIG. 4, in the first separator 31, a bottom of the outer cylinder 311 may is concaved downwards, and a deposition box 319 may be provided at a concaved portion. The deposition box 319 is in communication with the air flow passage 313. When the upwind direction flow flows through the air flow passage 313, the separated object converges at the concaved portion of the outer cylinder 311 and enters the deposition box 319, such that the air flow passage 313 has an enough communication area, thereby preventing the air flow passage 313 from being blocked due to accumulation of the separated object.

The deposition box 319 may be further provided with a sewage discharging door which may open and close automatically, such that the separated object is discharged when the separated object in the deposition box 319 is too much. Specifically, the sewage discharging door may be arranged at a bottom of the deposition box 319. A heating pipe surrounding the deposition box 319 may be further provided, and the hot air flow exhausted from the generator cavity 11 is introduced to the heating pipe, so as to heat the deposition box 319 with waste heat, thereby preventing caking due to mixing of moisture and dust in the separated object.

The open end of the outer cylinder 311 may be further provided with a flow guide surface 34 defining a hollow cavity to guide the upwind direction flow, such that the upwind direction flow smoothly enters the air flow passage 313. Specifically, the flow guide surface 34 may include an outer convex arc surface 341 and an inner concave arc surface 342 sequentially connected in the upwind direction, a circle center of the outer convex arc surface 341 is located at an inner side of the first separator 31, and a circle center of the inner concave arc surface 342 is located at an outer side of the first separator 31. By setting a radian of the inner concave arc surface 342, the upwind direction flow is converged inwards by the outer convex arc surface 341, and may flow roughly along a tangent line direction of the inner concave arc surface 342, as shown in FIG. 4. The inner concave arc surface 342 and the outer convex arc surface 341 may be connected smoothly, and in a direction from the first separator 31 to the second separator 32, the inner concave arc surface 342 is connected to the outer convex arc surface 341 to roughly form a reversed S-shaped structure. In one aspect, the inner concave arc surface 342 may extend a caliber of the open end of the outer cylinder 311 effectively, so as to accommodate the upwind direction flow as much as possible. However, if the inner concave arc surface 342 continues to extend outwards, a vertical segment perpendicular to the upwind direction flow may be formed. Therefore, an end part of the inner concave arc surface 342 may be connected to the outer convex arc surface 341, so as to converge an opening of the inner concave arc surface 342 and gather the upwind direction flow to a corresponding opening of the inner concave arc surface 342. By reasonably setting a radian of the inner concave arc surface 342, the upwind direction flow gathered by the outer convex arc surface 341 can be controlled to enter the air flow passage 313 roughly in the tangent line direction of the inner concave arc surface 342, thereby reducing resistance of the upwind direction flow to enter the air flow passage 313.

As shown in FIG. 1, a part of the hot air flow exhausted from the generator cavity 11 by the exhaust fan 4 may be transferred to the outer cylinder 311 of the first separator 31, to perform deicing on the first separator 31, thereby preventing icing of the outer cylinder 311 and the flow guide surface 34 connected to the open end of the outer cylinder 311.

Figure 5:
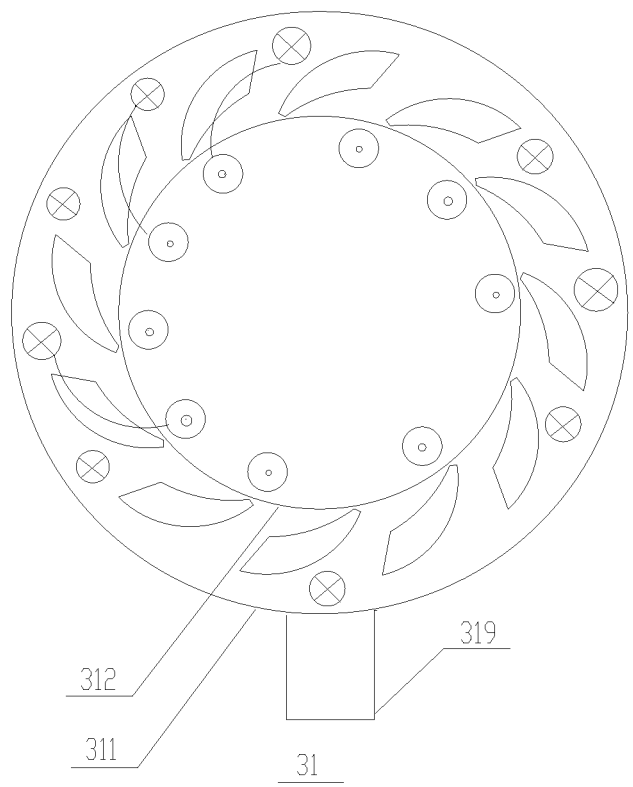
FIG. 5 is an axial side view of a first separator in the separation device shown in FIG. 3 in an upwind direction.
Figure 6:
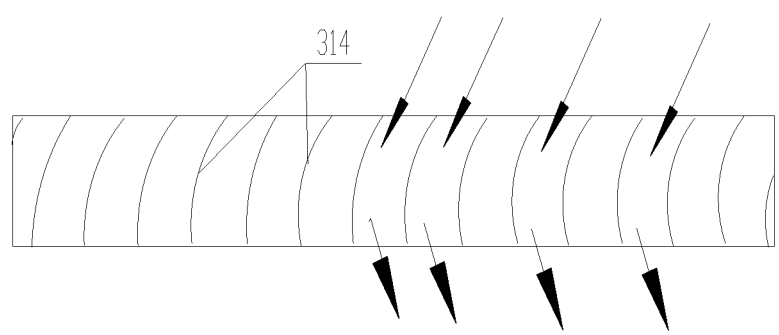
FIG. 6 is a schematic view of a spiral flow guide vane cascade in the first separator shown in FIG. 5 when being unfolded to a plane.

Referring to FIG. 5 and FIG. 6 further, in order to improve a separation effect, a spiral flow guide vane cascade 314 may be provided in the air flow passage 313, to guide an upwind direction flow to flow spirally, thereby achieving separation during the spirally flowing process. As shown in FIG. 5, the upwind direction flow entering the air flow passage 313 is indicated by a circle with cross, and an air flow flowing out of the air flow passage 313 is indicated by a circle with ring. The upwind direction flow may flow spirally out of the air flow passage 313 along the spiral flow guide vane cascade 314 and smoothly enter the cavity of the inner container 312. During this process, the upwind direction flow is guided by the spiral flow guide vane cascade 314, changes a flow direction by turning, and impact may inevitably be accompanied. Thus a flow rate of the air flow is reduced, and solid particles and liquid drops condense and grow up to be separated from the air flow, and finally enter the deposition box 319 at the bottom of the outer cylinder 311. As shown in FIG. 6, a screw pitch of the spiral flow guide vane cascade 314 may be set to match with an impurity-containing degree of the upwind direction flow and perform effective separation.

An inner wall of the outer cylinder 311 may be set as a concave-convex surface, such as a corrugated surface, to prevent the upwind direction flow from flowing directly through a gap between the spiral flow guide vane cascade 314 and the outer cylinder 311 without entering the spiral flow guide vane cascade 314. In this way, the arrangement of the inner wall of the outer cylinder 311 and the spiral flow guide vane cascade 314 allow the upwind direction flow to generate severe impact and rotation during the flowing process, i.e., the upwind direction flow performs a centrifugal motion, thereby facilitating improvement of the separation effect.

Figure 7:
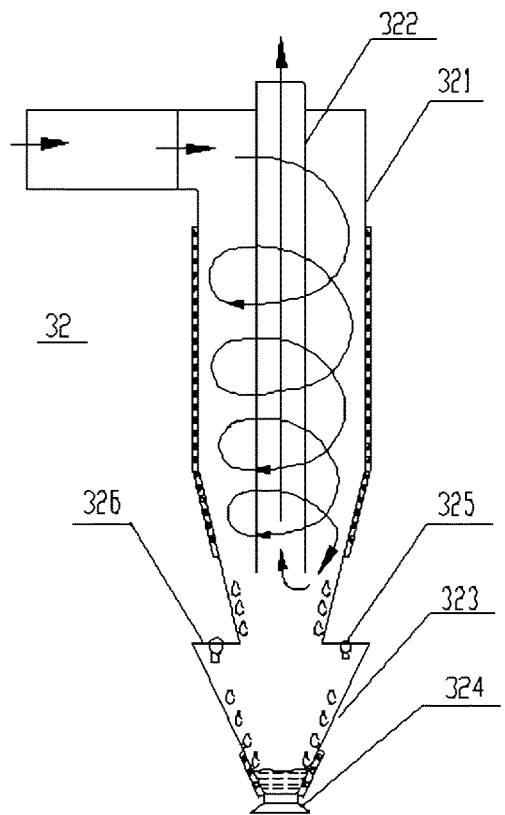
FIG. 7 is an axial side view of a second separator in the separator device shown in FIG. 3.

Referring to FIG. 7, the second separator 32 may include an inner cylinder 322 and an outer cylinder 321 nested from inside to outside. Two ends of the inner cylinder 322 are open. An air inlet of the outer cylinder 321 may be in communication with an air outlet of the first separator 31, to introduce air flow into a hollow cavity defined by the outer cylinder 321, thus separation is achieved in the hollow cavity, and generated clean air enters the inner cylinder 322 and is exhausted by the inner cylinder 322. A caliber of the outer cylinder 321 may progressively reduce in the air flow direction. As shown in FIG. 7, the outer cylinder 321 includes a hollow column and a hollow cone sequentially connected in the air flow direction. It should be understood that, the structure of the outer cylinder 321 is not limited herein, and the outer cylinder 321 as a whole may be arranged as a hollow cone. A bottom of the outer cylinder 321 may be provided with a collection box 323, and the separated object may enter the collection box 323.

By taking the inner cylinder 322 and the outer cylinder 321 extending up and down as an example, an upper end of the outer cylinder 321 may be in communication with the air outlet of the first separator 31, such that the air flow moves spirally downwards along the hollow cavity, and moves spirally upwards via an opening at a lower end of the inner cylinder 322 when reaching the bottom of the outer cylinder 321. The impurity such as the solid particles and the liquid drops has a great density, therefore when the rotational flow reaches the bottom of the outer cylinder 321, the impurity falls in the collection box 323 at the lower side of the outer cylinder 321 and the clean air flow enters the inner cylinder 322 and continues to flow upwards.

The collection box 323 may be set to be cone shaped, to guide the separated object to fall along an inner wall of the collection box 323. A large-diameter end of the collection box 323 is connected to a lower end of the outer cylinder 321, and a diameter of the large-diameter end of the collection box 323 is larger than a diameter of the lower end of the outer cylinder 321. At a position where the collection box 323 and the outer cylinder 321 are connected, an annular shoulder 326 of the collection box 323 is formed. The bottom of the collection box 323 may be provided with an exhaust port for the separated object, and specifically the exhaust port may be blocked by an air lock 324, to improve air tightness of the second separator 32. A second soot blower 325 such as an infrasonic wave soot blower may be further provided in the collection box 323, to blow the separated object. The second soot blower 325 is installed at the shoulder 326 of the collection box 323, to soot the separated object to the bottom of the collection box 323 in a flowing direction of the air flow. The bottom of the collection box 323 may be configured as a funnel-shape, to collect the separated object better.

As described above, in the present application, the second separator 32 is in communication with the separator heating branch pipeline 6. Specifically, a heating pipe may encircle the outer cylinder 321, and the separator heating branch pipeline 6 and the heating pipe are in communication with each other, to introduce hot air flow into the outer cylinder 321, thereby heating the air to be separated in the outer cylinder 321, preventing freeze and caking due to condensation of moisture and dust. Similarly, the separated object may converge at the bottom of the collection box 323, therefore a heating pipe may be provided at the bottom of the collection box 323 to introduce hot air flow for heating.

Whichever one of the inner cylinder 322, the outer cylinder 321 and the collection box 323 may be arranged in other forms such as a straight cylinder, and is not limited to the structure described above. The air flow entering the inner cylinder 322 and the outer cylinder 321 may flow spirally to improve a separation effect, or may flow linearly, which may be set by those skilled in the art according to separation requirements.

Figure 8:
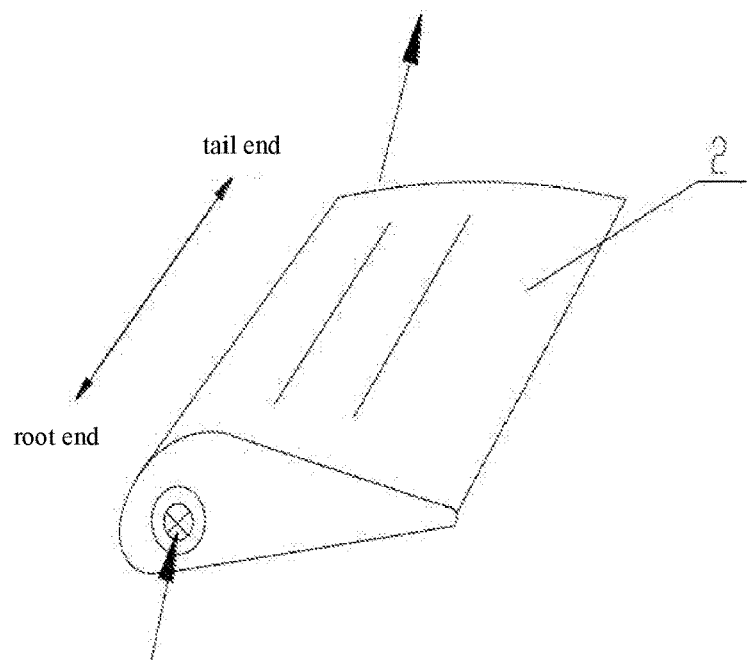
FIG. 8 is a schematic diagram showing that a blade of the wind power generator system according to the first embodiment of the present application utilizes waste heat of a cooling medium.
Figure 9:
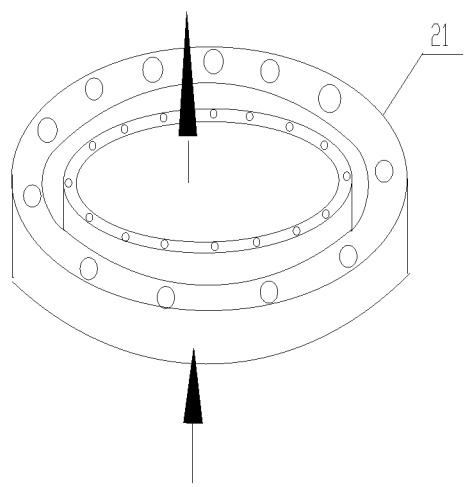
FIG. 9 is a schematic diagram showing that a pivotal bearing of the wind power generator system according to the first embodiment of the present application utilizes waste heat.

Referring to FIG. 8 and FIG. 9, as described above, the blade heating branch pipeline 7 may be further provided according to the present application. Specifically, the blade heating branch pipeline 7 may be in communication with a hub supporting a root part of the blade 2. The blade heating branch pipeline 7 is always in a static state and needs to be connected to the rotary blade 2 by a connection device. In this case, a pivotal bearing 21 may be provided to allow the blade heating branch pipeline 7 and the blade 2 to be connected rotatably, and the hot air flow is transferred into an inner cavity of the blade 2 through a gap of the pivotal bearing 21.

More specifically, taking an end of the blade 2 connected to the hub as a root end, an end of the blade 2 extending outwards is a tail end. The pivotal bearing 21 is connected to the root end of the blade 2. The hot air flow introduced by the blade heating branch pipeline 7 firstly flows through the pivotal bearing 21, and enters the inner cavity of the blade 2 via the root part of the blade 2. The hot air flow flows along the inner cavity of the blade 2, and are thrown out from the tail end of the blade 2 under the action of a centrifugal force.

In the present application, a noise absorber 8 may be further provided, which is configured to absorb air exhaust noise of the exhaust fan 4. The noise absorber 8 may be in communication with an air exhauster 9 configured to guide the exhausted air processed by the noise absorber 8, such that the exhausted air is exhausted roughly in the upwind direction, thereby avoiding interference with the upwind direction flow and avoiding noise generated due to impacting with the upwind direction flow.

A diffuser 41 may be provided at an exhaust port of the exhaust fan 4, and the exhaust port of the exhaust fan 4 is connected to the noise absorber 8 via the diffuser 41, to avoid influence on noise reduction due to a too great pressure of the air flow. According to different installation positions of the noise absorber 8, two embodiments, i.e., a first embodiment and a second embodiment, are provided according to the present application. The first embodiment and the second embodiment are described in detail in conjunction with FIG. 10 to FIG. 13 hereinafter.

It should be understood that, in the present application, the first embodiment and the second embodiment may only differ in the installation position of the noise absorber 8, and other parts may be configured with reference to the context.

First Embodiment

As shown in FIG. 1 and FIG. 2, in the first embodiment, an exhaust fan 4 and a noise absorber 8 may be arranged at a tail part of a nacelle 10 of a wind power generator system, and the separation device 3 may be located in an upwind direction of the exhaust fan 4 and the air exhauster 9. The exhaust fan 4, the noise absorber 8 and the air exhauster 9 may be in communication sequentially in the upwind direction. An air outlet of the air exhauster 9 may be designed as a flaring outlet, to improve exhaust efficiency and reduce exhaust noise. The air exhauster 9 may allow the exhausted air to be exhausted via the tail part of the nacelle 10 roughly in a direction parallel to the upwind direction flow. According to the fluid mechanics, a region which extends a certain distance from the tail part of the nacelle 10 in the upwind direction is basically a noise reduction region. When the air exhauster 9 guides the exhausted air to exhaust from the tail part in the upwind direction, noise reduction can be maximized.

Figure 10:
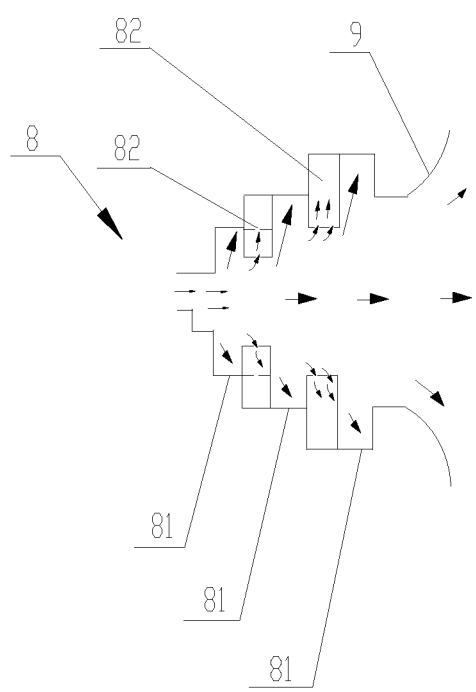
FIG. 10 is a schematic structural diagram of an arrangement manner of a noise absorber of the wind power generator system according to the first embodiment of the present application.

The noise absorber 8 may be arranged according to the principle of an expansion joint, and includes an expansion joint noise reduction cavity 81 and a resonance noise reduction cavity 82 arranged sequentially. As shown in FIG. 10, a three-stage of expansion joint noise reduction cavity 81 may be provided, and one resonance noise reduction cavity 82 is correspondingly arranged behind each stage of expansion joint noise reduction cavity 81, such that the exhausted air is diffused by the expansion joint noise reduction cavity 81 and then enters the resonance noise reduction cavity 82 to be resonantly silenced. Taking the expansion joint noise reduction cavity 81 as an example, the exhausted air diffuses by stage in all stages of the expansion joint noise reduction cavity 81, such that the diffused air flow can generate resonance better, thereby reducing noise effectively in the resonance noise reduction cavity 82. In an air exhaust direction, all stages of the expansion joint noise reduction cavity 81 may expand gradually and have volumes increased in a step manner, and the resonance noise reduction cavities 82 change according to the respective expansion joint noise reduction cavity 81.

Figure 11:
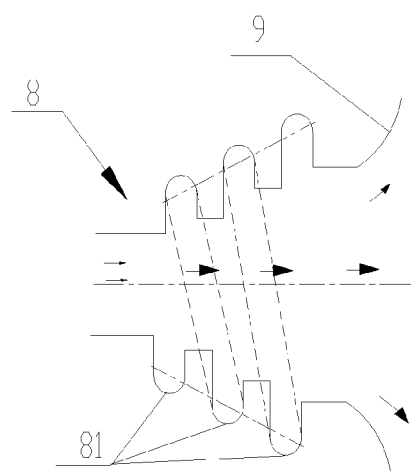
FIG. 11 is a schematic structural diagram of another arrangement manner of the noise absorber of the wind power generator system according to the first embodiment of the present application.

The noise absorber 8 is of various forms, and is not limited to the structure shown in FIG. 10. As shown in FIG. 11, in the case that the noise absorber 8 is designed as multiple stages of expansion joint noise reduction cavities 81 connected in series, the expansion joint noise reduction cavities 81 may be connected spirally, that is, the noise absorber 8 may be configured to have a spiral pipe structure. The noise absorber 8 may include sound-absorbent material or may be configured to have sound-absorbent structure of other forms.

It should be understood by those skilled in the art that, in the case that the noise absorber 8 is configured to have the spiral pipe structure, resonance and energy consumption are generated during a spiral surrounding process of the air flow, thereby reducing the noise. That is, with the spiral structure, it is not necessary to provide the resonance noise reduction cavity 82 specially.

Second Embodiment

Figure 12:
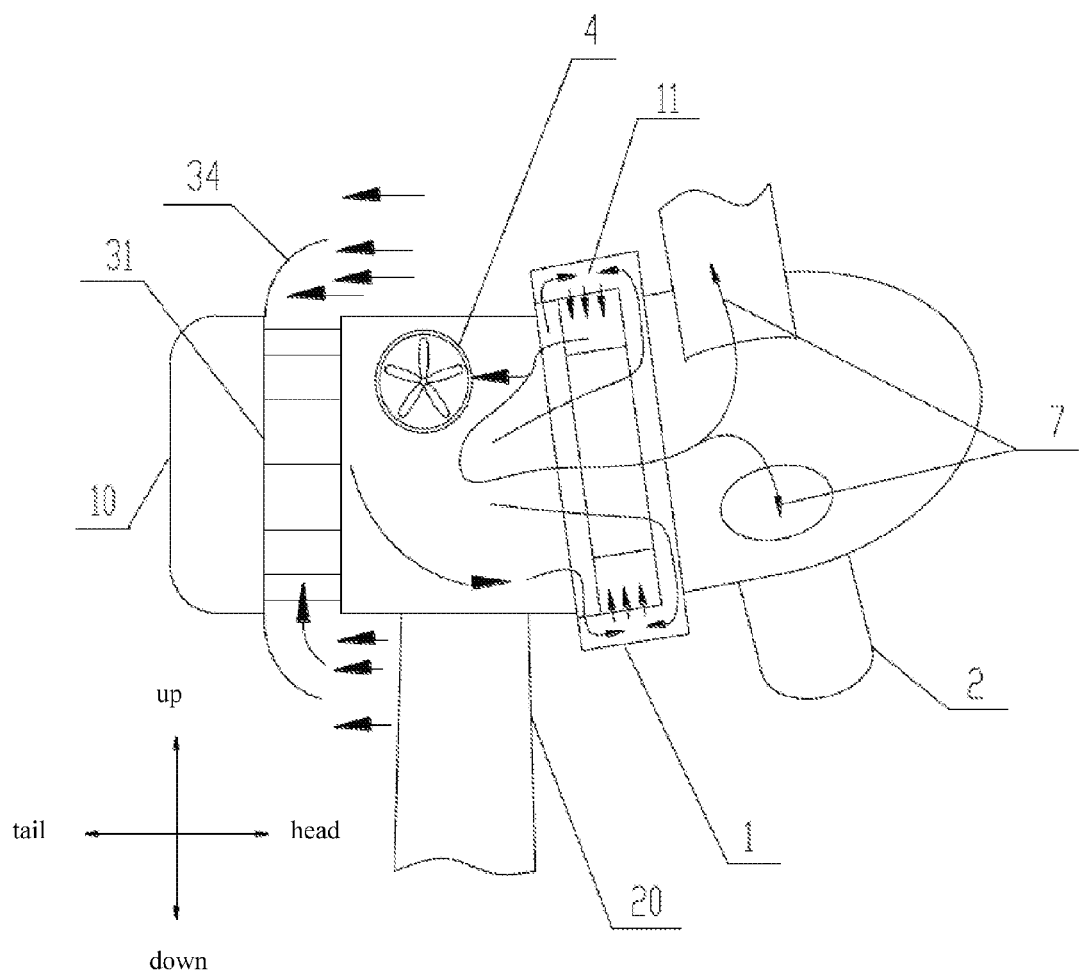
FIG. 12 is an axial side schematic diagram of a wind power generator system according to a second embodiment of the present application.
Figure 13:
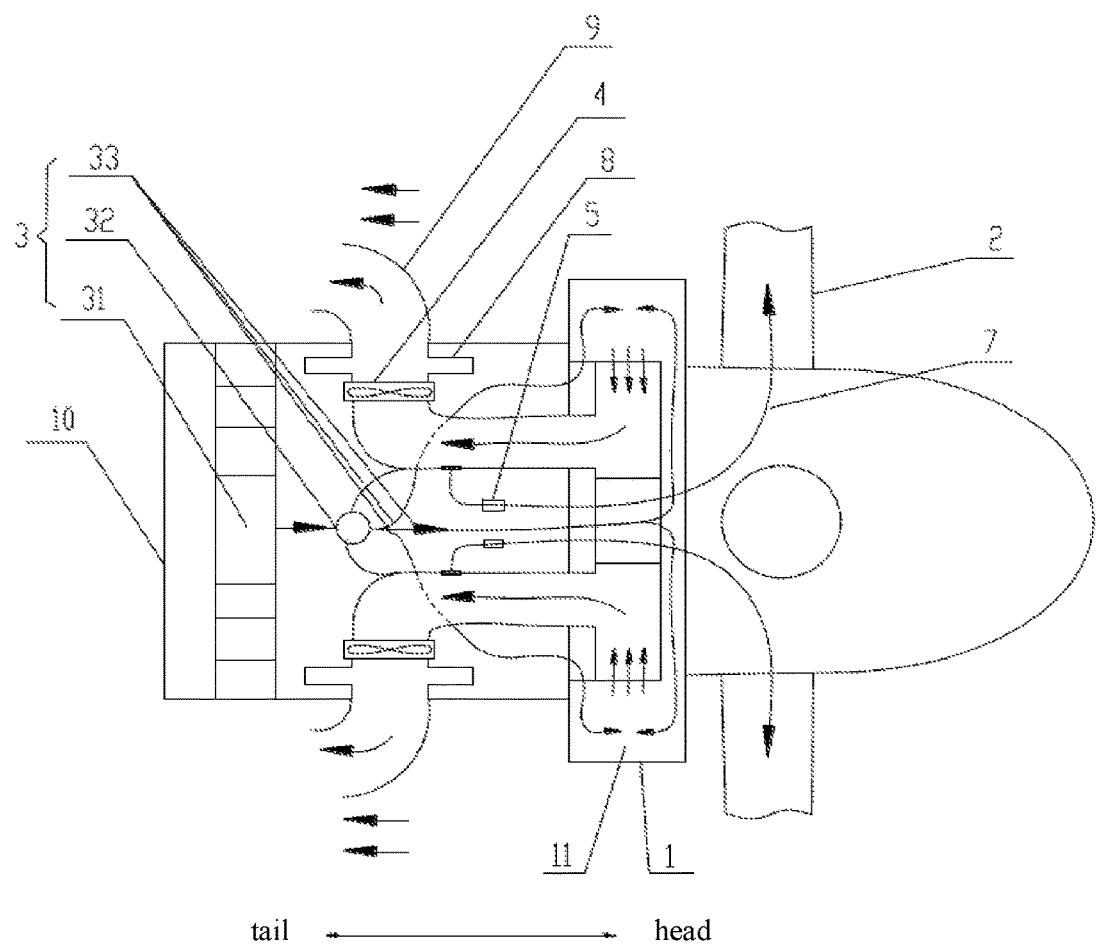
FIG. 13 is a top view of the wind power generator system according to the second embodiment of the present application.

Referring to FIG. 12 and FIG. 13, in the second embodiment of the present application, the exhaust fan 4 and the noise absorber 8 may be arranged at a lateral part of the nacelle 10 of the wind power generator system, and in this case, the separation device 3 is located in a downwind direction of the exhaust fan 4 and the air exhauster 9. The lateral part of the nacelle 10 is relative to the upwind direction, i.e., located at one side of the upwind direction or is not located in a head-tail direction, and specifically the lateral part may be in a direction perpendicular to the upwind direction. In this case, in order to avoid mutual interference between the upwind direction flow and the exhausted air from the air exhauster 9, an air inlet of the separation device 3 may be roughly perpendicular to an air outlet of the air exhauster 9, or a predetermined angle exists between the air inlet of the separation device 3 and the air outlet of the air exhauster 9, which is generally greater than 80 degrees.

It should be noted that, "roughly parallel" or "roughly perpendicular" mentioned in the embodiments of the present application all may deviate a certain angle relative to a parallel direction or a perpendicular direction, and it is appropriate that the angle is not greater than 10 degrees. However, in a special case, those skilled in the art may adjust the deviating angle as required.

No matter in the first embodiment or the second embodiment, in the case that the separation device 3 includes the first separator 31 and the second separator 32 or includes more separators, the separation device 3 locating in an upwind direction or a downwind direction of the exhaust fan 4 and the air exhauster 9 refers to that all the separators are located in the upwind direction or the downwind direction of the exhaust fan 4 and the air exhauster 9. When the separation device 3 includes too many separators, a space of the nacelle 10 of the wind power generator system is limited and all the separators cannot be installed in the upwind direction or the downwind direction. In this case, it is ensured that the separators for introducing the upwind direction flow should meet the installation relationship described above.

It may be noted that, in the first embodiment, the noise absorber 8 and the exhaust fan 4 are arranged at the tail part of the nacelle 10, and air is exhausted at the tail part; in this case, the exhaust fan 4 may be arranged at a posterior position of the tail part of the nacelle 10 as much as possible, the separators may be roughly arranged at a middle part of the nacelle 10 in a head-tail direction, such that there is a certain distance between the exhaust fan 4 and the separators in the head-tail direction. In the second embodiment, air is exhausted at the lateral part, therefore the exhaust fan 4 may be arranged close to a head part of the nacelle 10 as much as possible, so as to avoid the influence of the exhausted air on the upwind direction flow.

It should be understood that, due to influence of sight, only the first separator 31 is shown in FIG. 1 and FIG. 12, a connection state of the first separator 31 and the second separator 32 is shown only in FIG. 2 and FIG. 13, which should not be understood as a limit to the separation device 3.

In FIG. 1 to FIG. 13 for the embodiments of the present application, all arrows indicate a flow direction of the air flow, such that those skilled in the art can clearly understand the flow direction of the air flow and the specific solutions of the present application.

The wind power generator system includes many components and structures of the components are complicated, therefore only parts of the wind power generator system related to cooling of the generator 1 are described in the embodiments of the present application, and for other parts, reference may be made to the conventional technology, which is not described in detail herein. A fluid cooling device is further provided according to the present application. The fluid cooling device includes a power equipment with an overheated cavity and a separation device 3 configured to perform multiple-phase flow separation on the upwind direction flow. An air inlet of the separation device 3 is configured to introduce the upwind direction flow, and an air outlet of the separation device 3 is in communication with the overheated cavity. The overheated cavity is further in communication with an exhaust fan 4 configured to exhaust hot air flow.

It should be noted that, the overheated cavity is equivalent to the generator cavity 11 in the above description, the power equipment is equivalent to the generator 1 in the wind power generator system, and those skilled in the art may apply the fluid cooling device to various fields as needed, so as to perform air cooling on the overheated cavities in various fields.

Specifically, the separation device 3 and the exhaust fan 4 may be set by reference to the above description. In addition, by reference to the wind power generator system described above, related devices for reducing noise and preheating may be provided, which are not described in detail herein.

For example, an internal combustion engine and a traction motor in a railway locomotive are required to be cooled. The internal combustion engine and the traction motor operate in a natural environment; when the devices are cooled by means of cooling air in the natural environment, multi-phase separation is also performed on the upwind direction flow, the hot air flow is recycled, and noise pollution generated during exhausting the hot air flow is suppressed. The fluid cooling device for performing multi-phase separation, heat exchange and noise reduction on the upwind direction flow according to the present application may also be applied to the field.

In addition, the separation device 3 configured to separate the multi-phase flow according to the present application may also be applied in industries or fields of textile, spinning and cigarette manufacturing.

The wind power generator system and the fluid cooling device according to the present application are described in detail above. The principles and the implementations of the present application are clarified by specific examples in the embodiments of the present application, and the illustration of the above embodiments is only used to facilitate understanding core ideas of the present application. It should be noted that, for those skilled in the art, several improvements and modifications may be made to the present application without departing from the principles of the present application, and the improvements and modifications fall within the protection scope of claims of the present application.

The invention claimed is:

1. An air-cooled wind power generator system, comprising:
   a generator comprising a generator cavity;
   a separation device, which is arranged at one end of the generator cavity and in communication with the generator cavity, wherein the separation device comprises a first separator and a second separator, the first separator comprises a first air inlet configured to receive an upwind direction flow of air and a first air outlet, and the second separator comprises a second air inlet and a second air outlet, the first air outlet is in communication with the second air inlet, wherein the first separator comprises an outer cylinder with one end of the outer cylinder closed and a hollow inner container nested in the outer cylinder, the inner container having two ends, both ends of the inner container are open, an air flow passage is formed between an inner circumferential wall of the outer cylinder and an outer circumferential wall of the inner container; and one end of the air flow passage extends towards the closed end of the outer cylinder and is in communication with a third air inlet of the inner container, an other end of the air flow passage forms a fourth air inlet configured to receive the upwind direction flow of air, and a third air outlet of the inner container is in communication with the second air inlet of the second separator, at least one output pipeline arranged at another end of the generator cavity and in communication with the generator cavity, wherein an exhaust fan is arranged in the at least output pipeline, and the exhaust fan is configured to exhaust hot air flow heated in the generator cavity.

2. The air-cooled wind power generator system according to claim 1, wherein a heater is provided in a communication pipeline via which the second air outlet of the second separator is in communication with the generator cavity.

3. The air-cooled wind power generator system according to claim 2, wherein the communication pipeline comprises at least two branch pipelines, each of which is in communication with the generator cavity, and at least one of the branch pipelines is provided with the heater.

4. The air-cooled wind power generator system according to claim 3, wherein the generator comprises an inner stator support, an inner stator iron core, a permanent magnetic pole and an outer rotor magnet yoke, which are nested sequentially from inside to outside;

the generator cavity comprises an inner cavity, a middle cavity and an outer cavity arranged sequentially from inside to outside, wherein a hollow cavity of the inner stator support forms the inner cavity and middle cavity, an air gap between the inner stator iron core and the permanent magnetic pole forms the outer cavity, wherein the inner cavity is hollow in an axial direction of the generator and in communication with the outer cavity; and the branch pipelines are in communication with the inner cavity or the outer cavity, and the middle cavity is in communication with the exhaust fan.

5. The air-cooled wind power generator system according to claim 4, wherein at least two of the at least two branch pipelines are in communication with the inner cavity and the outer cavity respectively, the heater is arranged in one of the at least two of the at least two branch pipelines that is in communication with the inner cavity or the outer cavity, and air flows transferred by the branch pipelines converge in the outer cavity and flow into the middle cavity.

6. The air-cooled wind power generator system according to claim 5, wherein the second air outlet of the second separator is provided with three branch pipelines, two of the three branch pipelines are in communication with the outer cavity, the remaining one of the three branch pipelines is in communication with the inner cavity and the heater is arranged in the rest one branch pipeline.

7. The air-cooled wind power generator system according to claim 1, further comprising a separator heating branch pipeline via which the generator cavity is in communication with the second separator, wherein the separator heating branch pipeline is configured to transfer the hot air flow in the generator cavity to the second separator to heat a cylinder of the second separator and air to be separated in the cylinder.

8. The air-cooled wind power generator system according to claim 1, wherein an inner wall of the outer cylinder is a concave-convex surface, and a spiral flow guide vane cascade is provided in the air flow passage.

9. The air-cooled wind power generator system according to claim 1, wherein the air outlet of the inner container is connected with a separation segment, and a caliber of the separation segment decreases progressively in a direction from the first separator to the second separator.

10. The air-cooled wind power generator system according to claim 9, wherein the air outlet of the inner container is provided with a flaring segment-configured to connect the separation segment; and an expansion cavity configured to accommodate a separated object is formed at a connecting position of the flaring segment and the separation segment.

11. The air-cooled wind power generator system according to claim 10, wherein a first soot blower configured to blow the separated object into the expansion cavity is provided in an upwind direction of the expansion cavity.

12. The air-cooled wind power generator system according to claim 9, wherein the separation segment is an inward-concave arc-shaped revolved body; and/or the separation segment is provided with a thermal insulation interlayer or a heating interlayer.

13. The air-cooled wind power generator system according to claim 1, wherein a bottom of the outer cylinder is concaved downwards and is provided with a deposition box in communication with the air flow passage, and the deposition box is provided with a heater.

14. The air-cooled wind power generator system according to claim 1, wherein the open end of the outer cylinder is provided with a flow guide surface, the flow guide surface comprises an outer convex arc surface and an inner concave arc surface sequentially arranged and connected in the upwind direction flow of air, and the upwind direction flow of air inflows along a tangent line direction of the inner concave arc surface.

15. The air-cooled wind power generator system according to claim 7, wherein the second separator comprises an inner cylinder and an outer cylinder, the outer cylinder defines a hollow cavity, an air inlet of the hollow cavity is in communication with the air outlet of the first separator, an air outlet of the hollow cavity is in communication with an air inlet of the inner cylinder, and an air outlet of the inner cylinder forms the second air outlet of the second separator.

16. The air-cooled wind power generator system according to claim 15, wherein the second separator further comprises a collection box in communication with the hollow cavity and configured to collect the separated object; and the collection box is provided with an exhaust port configured to exhaust the separated object, and the exhaust port is blocked by an air lock.

17. The air-cooled wind power generator system according to claim 1, further comprising a blade indirectly connected to a rotor of the generator and a blade heating branch pipeline, via which an inner cavity of the blade and the motor inner cavity are in communication with each other, wherein the blade heating branch pipeline is configured to transfer the hot air flow in the motor inner cavity to the inner cavity of the blade; and the blade heating branch pipeline is rotatably connected to the blade via a pivotal bearing and is in communication with the inner cavity of the blade by means of the pivotal bearing.

18. The air-cooled wind power generator system according to claim 17, further comprising a noise absorber and an air exhauster, wherein the noise absorber is configured to absorb air exhaust noise from the exhaust fan and is in communication with the air exhauster, and the air exhauster guides air to be exhausted in the upwind direction.

19. The air-cooled wind power generator system according to claim 18, further comprising a nacelle, and the separation device being received in the nacelle, wherein:

the exhaust fan and the noise absorber are installed at a tail part of the nacelle of the wind power generator system, and the separation device is located in an upwind direction of the exhaust fan and the air exhauster; or the exhaust fan and the noise absorber are installed at a lateral part of the nacelle of the wind power generator system, the separation device is located in a downwind direction of the exhaust fan and the air exhauster, and the air inlet of the separation device is perpendicular to an air outlet of the air exhauster.

20. The air-cooled wind power generator system according to claim 18, wherein the noise absorber comprises a plurality of expansion joint noise reduction cavities configured to diffuse the exhausted air, the plurality of expansion joint noise reduction cavities are connected in series sequentially and have progressively increased volumes in an air exhaust direction, and a resonance noise reduction cavity configured to perform resonance noise reduction on exhausted air is provided between adjacent ones of the expansion joint noise reduction cavities; or the noise absorber comprises a plurality of expansion joint noise reduction cavities configured to diffuse the exhausted air, the plurality of expansion joint noise reduction cavities are connected sequentially to present a spiral shape with the air exhaust direction as an axial direction, and have progressively increased volumes in the air exhaust direction.

21. The air-cooled wind power generator system according to claim 18, wherein an exhaust port of the exhaust fan is provided with a diffuser and is in communication with the noise absorber via the diffuser.

22. A fluid cooling device, comprising:

a power equipment having an overheated cavity;

a separation device, which is arranged at one end of the overheated cavity and in communication with the overheated cavity, wherein the separation device comprises a first separator and a second separator, the first separator comprises a first air inlet and a first air outlet, and the second separator comprises a second air inlet and a second air outlet, the first air outlet is in communication with the second air inlet, wherein the first separator comprises an outer cylinder with one end of the outer cylinder closed and a hollow inner container nested in the outer cylinder, the inner container having two ends, both ends of the inner container are open, an air flow passage is formed between an inner circumferential wall of the outer cylinder and an outer circumferential wall of the inner container; and one end of the air flow passage extends towards the closed end of the outer cylinder and is in communication with a third air inlet of the inner container, an other end of the air flow passage forms a fourth air inlet configured to introduce an upwind direction flow of air, and a third air outlet of the inner container is in communication with the second air inlet of the second separator, at least one output pipeline arranged at another end of the overheated cavity and in communication with the overheated cavity, wherein an exhaust fan is arranged in the at least one output pipeline, and the exhaust fan is configured to exhaust hot air flow heated in the overheated cavity.

* * * * *